J. J. JOHNSTON,
Corn Sheller.
No. 13,912.
2 Sheets—Sheet 1.
Patented Dec. 11, 1855.
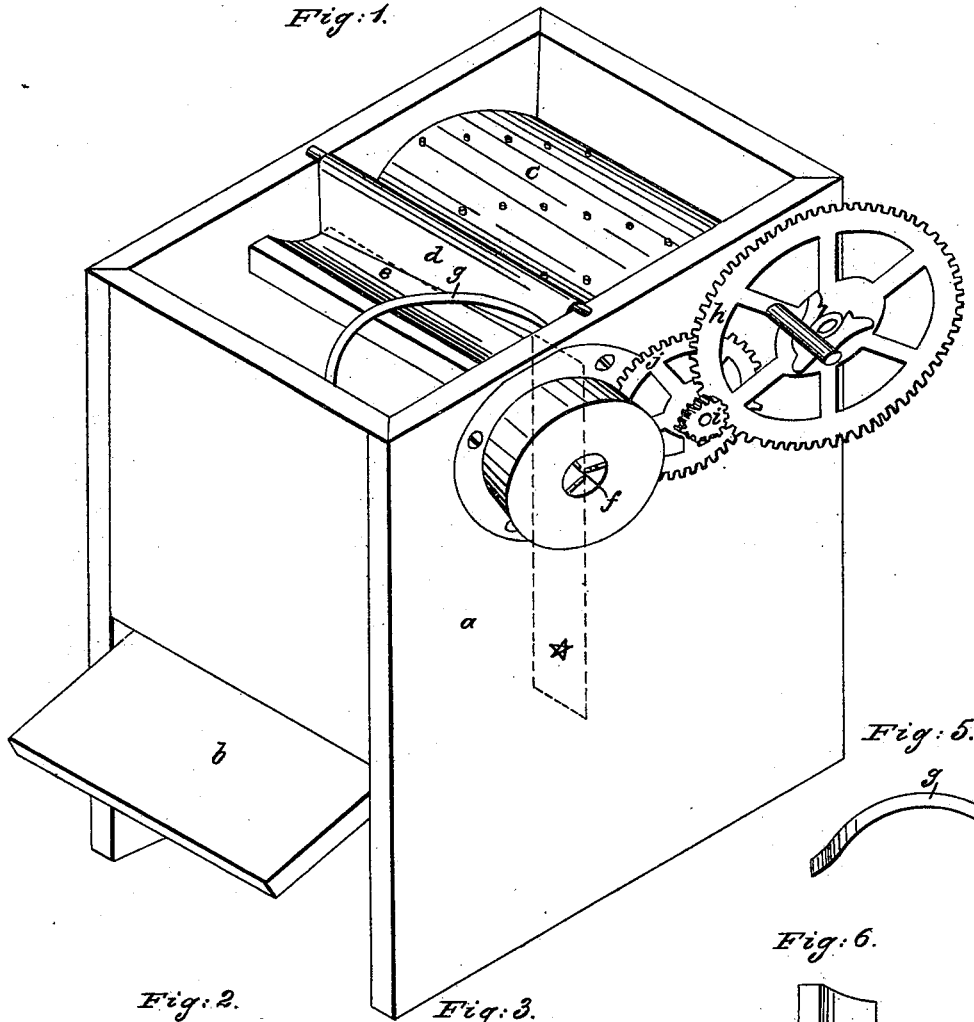

J. J. JOHNSTON.
Corn Sheller.
No. 13,912.
2 Sheets—Sheet 2.
Patented Dec. 11, 1855.
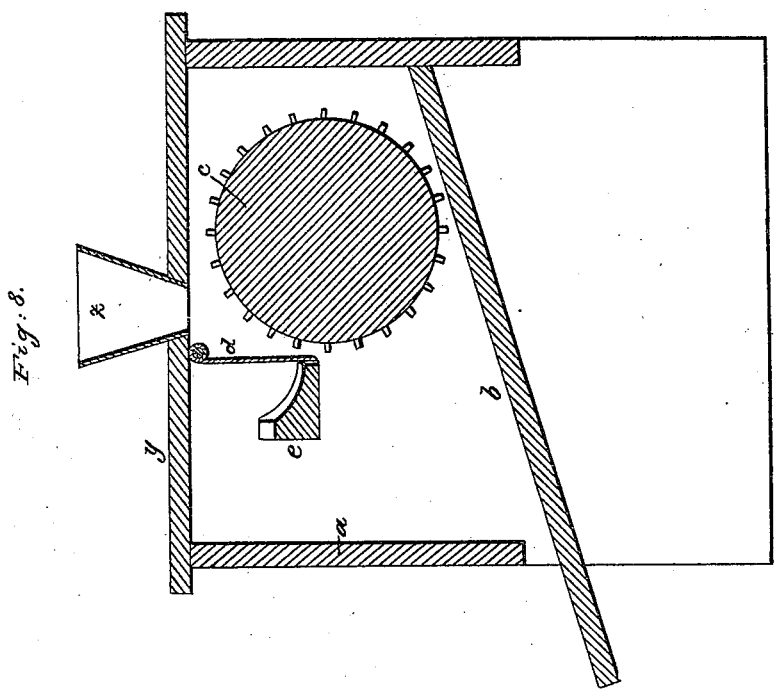
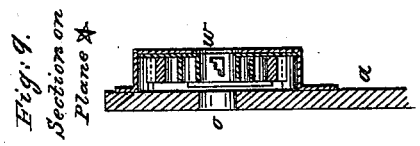
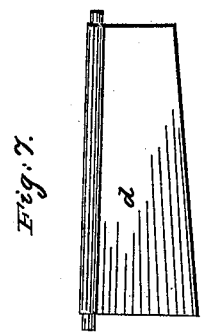

UNITED STATES PATENT OFFICE.

JAMES J. JOHNSTON, OF ALLEGHENY CITY, PENNSYLVANIA.

CORN-SHELLER.

Specification of Letters Patent No. 13,912, dated December 11, 1855.

*To all whom it may concern:*

Be it known that I, JAMES JONES JOHNSTON, of Allegheny City, Pennsylvania, have invented new and useful Improvements in Corn-Shellers; and I do hereby declare the following to be a full, clear, and exact description of the same, reference being had to the annexed drawing, lettered and marked to correspond with this specification and made part of the same.

One of the objects of my invention is to combine quantity and completeness within the functions of the same cornsheller. The nature of this part of my invention is to run a series of cleavers or pickers over the cob as it leaves the machine and thereby secure the stripping from the cob of every grain of corn. All drum shellers leave a great deal of corn on the cob if the corn be green, and more or less very often though the corn be dry and hard. In my sheller not a grain escapes with the cob whether the corn be green or old.

Another object of my invention is to prevent obstruction of the spring press-plate by corn forced behind or catching under it so that the machine has to be stopped. This I effect by using a concave which is a section of a cone and a spring press-plate of corresponding radii or sweep and which therefore hold the same relation to each other no matter how far the plate be pressed back, the conical concave resting its base toward the usual discharge-hole for the cob and thus by its descending inclination thereto aiding the travel of the cob toward said hole.

My improvement further consists in the quick pitch given the spiral lines on which the teeth are set in the drum and the reduction of the number of said lines of teeth, an improvement due to the use of the secondary pickers or cleaners, which enable me to drive the corn more rapidly toward the secondary cleaners or pickers.

My improvement also consists in the mechanical construction and arrangement of the parts involved in the secondary-cleaning apparatus.

Similar letters refer to similar parts in the several figures of the drawing.

Figure 1 is an isometrical view without the top, the geared side looking toward the right.

($a$) is the ordinary casing, being oblong.

($b$) is the delivering board for the shelled corn.

($c$) is the drum with six spiral lines of quick pitch set with teeth.

($d$) is the press plate, of radii suitable to the sweep of the section of the conical concave breast-plate ($e$), the base of the section and the longest radius resting next the discharge-opening in the case ($a$) for the cob, which opening leads to the secondary cleaners or pickers ($f$).

($g$) is the spring to act on the press-plate ($d$).

The wheel ($h$) drives the pinion ($i$) fixed on the shaft of the drum ($c$) and also drives the wheel ($j$) fixed on the same shaft and projecting through an opening ($k$) (seen in Fig. 2 which represents in suitable perspective for such exhibit, the cap ($2$)). This wheel ($i$) drives (through the opening ($k$)) the annular wheel ($m$) which is fastened to a short cylinder or ring ($n$) and both ($m$ and $n$) to a disk ($o$) with a central opening ($p$) of the size of the discharge opening in the casing ($a$). See Fig. 3 for the foregoing and also for the two short cylinders or rings ($q$ and $r$) through slots in which at three equal distances apart play the secondary cleaners or pickers ($f$) which are kept up to their axis of motion by the three springs (one to each picker) ($s$) and which cleaners are restrained from projecting beyond their field of action or from dropping out by the shoulder ($t$), see Fig. 4, which figure also shows the cutting faces receding by steps, the shortest cutter being next the opening ($w$) in the cap ($z$). The rings or short cylinders ($n$ $q$ and $r$) of the wheel ($m$) are concentric to the disk ($o$). The ring ($r$) is of the diameter of the opening ($p$). The ring ($q$) is sufficiently greater in diameter than the ring ($r$) to steady and hold in place the secondary cleaners or pickers ($f$). The cap ($l$) covers in the disk ($o$) and the parts thereon, the diameter and depth of the ring or short cylinder ($n$) of the cap enabling it to receive and permit the rotation of the disk ($o$) and the parts thereon.

A flange ($r$) projects from the base of the cylinder ($n$) for fastening the same to the case ($a$). The opening ($k$) is in the cylinder ($n$) of the cap ($l$), and an opening ($w$) in the cover ($x$) of said cap. Said opening ($w$) being circular and slightly greater in diameter than the discharge opening in the case (*a*) or the opening (*p*) in the disk (*o*), the axis of these openings being in the same line.

The spring (*g*) is shown in Fig. 5, the breast plate (*e*) in Fig. 6, the press-plate (*d*) (with its drum face exposed) in Fig. 7, and Fig. 8 is a vertical and central section lengthwise the corn-sheller, showing the top (*y*) and the hopper (*z*) in addition to the parts (*a*, *b*, *c*, *d*, and *e*).

Having thus fully described my improvements in corn-shellers what I claim and desire to secure by Letters Patent therefor, are.

1. Secondary cleaners or pickers for the purpose described.

2. The mechanical arrangement of the secondary pickers or cleaners (*f*) with the disk (*o*) and its central opening (*p*), the pinion (*m*), the ring (*n*), the slotted rings (*q* and *r*), the springs (*s*), the flanged cap (*l*) with its central opening (*w*) in its top (*x*), and slot (*k*) in its cylindrical portion (*u*), whether the cutters have receding positions on the cleaners or pickers (*f*) or not, or whether the cleaners or pickers (*f*) are held in place by the shoulders (*t*) or other device, or whether other equivalent mechanical arrangement is substituted for operating the secondary cleaners for the purpose described.

3. The breast-plate (*e*) and the press-plate (*d*) in the manner and for the purpose described.

JAMES J. JOHNSTON.

Attest:
THOS. G. CLINTON,
JOHN S. HOLLINGSHEAD.